US005987372A

United States Patent [19]

Wolf et al.

[11] Patent Number: 5,987,372

[45] **Date of Patent: *Nov. 16, 1999**

[54] SAFETY SYSTEM FOR A MOTOR VEHICLE

[75] Inventors: Hans-Christoph Wolf, Stuttgart, Germany; Juergen Schenk, Albershausen, Germany

[73] Assignee: Mercedes Benz AG, Germany

[ * ] Notice: This patent is subject to a terminal disclaimer.

[21] Appl. No.: 08/879,037

[22] Filed: Jun. 19, 1997

[30] Foreign Application Priority Data

Jun. 21, 1996 [DE] Germany ........................... 196 24 822

[51] Int. Cl.[6] ............................. B60L 11/02; B60K 11/04

[52] U.S. Cl. ............................ 701/69; 701/101; 318/139; 180/65.4; 290/14; 290/17

[58] Field of Search .................................... 701/101, 102, 701/110, 69; 180/197, 65.1, 65.2, 65.3, 65.4, 65.5, 165, 282; 60/431, 434, 445, 452; 290/14, 17; 318/139

[56] References Cited

U.S. PATENT DOCUMENTS

| | | | |
|---|---|---|---|
| 5,280,223 | 1/1994 | Grabowski et al. | 180/65.4 |
| 5,373,219 | 12/1994 | Grabowski et al. | 180/65.4 |
| 5,432,413 | 7/1995 | Duke et al. | 180/65.4 |
| 5,638,677 | 6/1997 | Hosono et al. | 60/431 |
| 5,679,985 | 10/1997 | Fredriksen et al. | 475/731.1 |

FOREIGN PATENT DOCUMENTS

| | | |
|---|---|---|
| 39 13 609 | 11/1989 | Germany . |
| 39 14 167 | 11/1989 | Germany . |
| 39 24 922 | 2/1990 | Germany . |
| 43 15 885 | 5/1993 | Germany . |
| 44 07 475 | 9/1995 | Germany . |

*Primary Examiner*—Jacques H. Louis-Jacques
*Attorney, Agent, or Firm*—Evenson, McKeown, Edwards & Lenahan, P.L.L.C.

[57] ABSTRACT

The invention relates to a safety system for a motor vehicle having an internal-combustion engine. Independent quantities are used for the engine control and for the monitoring of the engine control. The control of the internal-combustion engine takes place by way of an operating parameter indicative of the operating condition of the internal-combustion engine—such as the engine load. In contrast, the monitoring of the engine control takes place by means of a quantity indicative of vehicle propulsion, such as the vehicle output torque, which is determined on the basis of a rotational wheel speed. The desired values for the engine control and for the monitoring are determined from the accelerator pedal position. The detection of the corresponding actual values is based on independent input quantities.

10 Claims, 1 Drawing Sheet

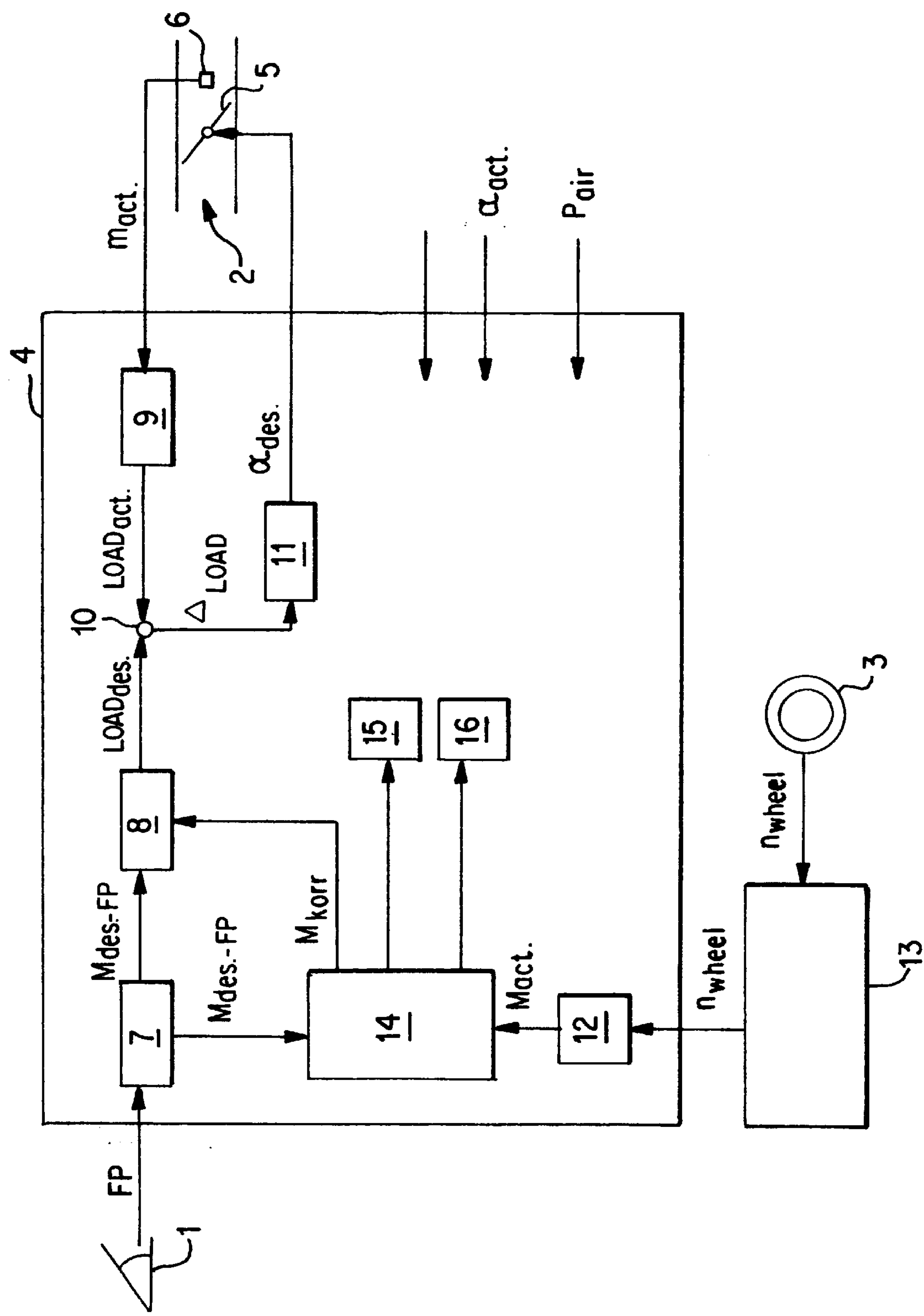
1
FP
7
Mdes.-FP
Mdes.-FP
8
LOADdes.
10
LOADact.
Δ LOAD
9
11
αdes.
mact.
2
5
6
4
αact.
Pair
Mkorr
14
15
16
Mact.
12
nwheel
nwheel
13
3

SAFETY SYSTEM FOR A MOTOR VEHICLE

BACKGROUND AND SUMMARY OF THE INVENTION

This application claims the priority of German Application No. 196 24 822.1, the disclosure of which is expressly incorporated by reference herein.

The invention relates to a safety system for a motor vehicle having an internal-combustion engine.

German Patent Document 39 14 167 A1 discloses a safety system for a motor vehicle internal-combustion engine in which the output torque of a transmission is monitored, and if it exceeds a given minimal value when the accelerator pedal is not depressed, operation of the internal-combustion engine is interrupted. This system has the disadvantage that it engages only when the accelerator pedal is not depressed, and cannot recognize other faulty functions.

In addition, systems are known in which the throttle valve position is used as an input quantity for monitoring. These systems have the disadvantage that a single quantity is used both for controlling the internal-combustion engine and for monitoring. Should a fault occur, both the engine control and the monitoring device will operate with the wrong quantity. Another problem of such monitoring devices occurs in the case of internal-combustion engines with dynamic torque adjustment in which, particularly in transient operating conditions, there is no direct relationship between the throttle valve position and the engine load. Thus, in the case of such internal-combustion engines, monitoring cannot be performed on the basis of the throttle valve position.

It is an object of the present invention to provide a safety system for a motor vehicle with an internal-combustion engine which ensures the safety of the motor vehicle in all operating ranges, and which can also be used with internal-combustion engines that have a dynamic torque adjustment.

These and other objects and advantages are achieved according to the invention, by using different quantities for the engine control on the one hand, and for monitoring of the engine control on the other hand. Control of the internal-combustion engine is based on an operating parameter which is indicative of the operating condition of the internal-combustion engine, such as the engine load. In contrast, monitoring of the engine control is based in a quantity which is indicative of the vehicle propulsion, such as the vehicle output torque (determined on the basis of a rotational wheel speed). The desired values for engine control and for monitoring are determined from the accelerator pedal position, while detection of the corresponding actual values is based on independent input quantities.

Because independent input quantities are used for the engine control and for the monitoring in the safety system according to the invention, if the sensing of one of the two quantities fails, either the engine control or the monitoring can continue to operate properly. If the engine control fails, the safety system can ensure at least an emergency operation, or that the internal-combustion engine is rendered inoperative.

Another advantage is that more than simply a single operating parameter of the internal-combustion engine is checked with respect to a plausibility; rather, the safety system operates on a physical plane. In principle, the accelerator pedal position corresponds to the drivers's desire to change the vehicle to a given condition. In order to achieve the desired condition, the engine control will provide and correspondingly adjust desired values for the operating parameters of the internal-combustion engine, based on the accelerator pedal position. Simultaneously, a desired value is determined by the safety system for the expected reaction of the vehicle based on the accelerator pedal position, and is compared with the actual reaction.

If the safety system is used with of a vehicle having a traction control system, the reaction of the vehicle can be detected by means of at least a rotational wheel speed. The rotational wheel speed $n_{wheel}$ does not have to be detected separately, but can be transmitted by the traction control system to the safety system. Thus, no additional constructional expenditures are required for the safety system.

Other objects, advantages and novel features of the present invention will become apparent from the following detailed description of the invention when considered in conjunction with the accompanying drawings.

BRIEF DESCRIPTION OF THE DRAWINGS

The single FIGURE of the drawing shows the basic construction of a safety system according to the invention.

DETAILED DESCRIPTION OF THE DRAWINGS

As indicated in the FIGURE, the position FP of an accelerator pedal 1, at least one operating parameter indicative of the operating condition of the internal-combustion engine (such as the engine load $load_{act}$) and at least one quantity indicative of the vehicle propulsion (such as a rotational wheel speed $n_{wheel}$) are determined as input quantities and are provided by way of data lines to an analyzing device 4. According to the embodiment, the load is sensed indirectly by measuring the actual air mass flow $m_{act}$ in the intake pipe 2 of the internal-combustion engine (not shown). The actual air mass flow $m_{act}$ can be adjusted, for example, by means of a throttle valve 5 and by means of a hot-wire mass air flow meter 6.

The analyzing device 4 is hereinafter referred to as the engine control device. In block 7 thereof, a vehicle propulsion demand is determined from the accelerator pedal position FP (for example, a torque desired by the driver $M_{des\text{-}FP}$), and in block 8 a desired value is determined therefrom for the operating parameter indicative of the operating condition of the internal-combustion engine (for example, a desired load value $load_{des}$). Simultaneously, an actual load value $load_{act}$ is determined in block 9 based on the actual air mass flow $m_{act}$, and in block 10 is compared with the desired load value $load_{des}$ to determine a differential value $\Delta_{load}$. From this differential value $\Delta_{load}$, a desired throttle valve value $\alpha_{des}$ is then determined in block 11 and by means of a throttle valve adjustment, (not shown), the throttle valve 5 is adjusted to this desired value $\alpha_{desired}$.

The above-described steps are used to control the power of the internal-combustion engine or of the vehicle. For this purpose, additional parameters, such as the rotational engine speed or the engine temperature are provided to the engine control unit 4. Also, in addition to the throttle valve position FP, the engine control unit 4 influences other operating parameters, such as the ignition time (block 15) or the fuel quantity (block 16). Such processes are known from the state of the art (for example, German Patent Document DE 43 15 885 C1), and will not be explained here in detail.

In the event of operating disturbances of the internal-combustion engine (for example, with respect to the sensing of the air mass flow $m_{act}$ or with respect to the adjustment of the throttle valve position $\alpha_{des}$), vehicle operation may be impaired, and the operating safety of the vehicle may even be influenced considerably. In particular, it may occur that the throttle valve 5 will jam in the fully opened position. It is therefore necessary to provide a safety system which ensures safe operation of the vehicle despite the operating disturbance, or at least ensures the internal-combustion engine will be switched off.

According to the embodiment illustrated in the drawing, a sensor (not shown) for detecting a rotational wheel speed $n_{wheel}$ is provided on at least one vehicle wheel 3. By way of a data line, this rotational wheel speed $n_{wheel}$ is transmitted to the engine control unit 4. The actual vehicle propulsion value in the form of the output torque $M_{act}$ is determined in block 12 by time differentiation of the rotational speed signal $n_{wheel}$ and subsequent multiplication by the vehicle mass. In normal operation of the internal-combustion engine, the two input quantities $M_{des-FP}$, $M_{act}$ should closely correspond, apart from slight fluctuations, with deviations occurring only when there is a malfunction of the signal sensing, signal transmission or signal processing. For this reason, the differential value $\Delta M$ is continuously compared in block 14 with a predetermined threshold value $M_{thresh}$; if it exceeds the threshold value $M_{thresh}$ for a given time period, a defect is recognized.

If such a fault is recognized, different measures can be provided. In the simplest case, a fault signal is generated and indicated to the driver and/or is stored in a memory for a later analysis. However, the operability of the internal-combustion engine cannot be ensured on the basis of this measure alone. It may also be necessary to intervene in the engine control. One possibility consists of determining a corrected, higher-priority desired torque $M_{corr}$ in block 14 on the basis of the differential value $\Delta M$ and transmitting it to block 7.

Another possible response to the recognition of a fault condition consists of reducing the output torque $M_{act}$ by ignition intervention, for example, a temporary advance or retarding of the ignition point. For this purpose, a corresponding fault signal is generated in block 14 and is transmitted via a data line to the ignition adjustment (block 15). If this measure also is not effective to limit the output torque $M_{act}$ to a value $M_{actual}<=M_{des-FP}$, the internal-combustion engine must possibly be rendered inoperative, by switching off the fuel. For this purpose, a corresponding fault signal is again generated in block 14 and is transmitted to the fuel distributing system (block 16).

Block 14 therefore represents the actual module for monitoring the internal-combustion engine. It compares torque desired by the driver $M_{des-FP}$ with the actual output torque $M_{act}$ and, in the case of a deviation, it generates corresponding signals to prevent an excessive output torque $M_{act}$ by reducing the load indication (block 8), by ignition intervention (block 15) and/or by a fuel switch-off 16.

The exchange of data or measuring signals between the individual sensors and analyzing devices 4, 13 can be implemented by way of arbitrary data connections. In the simplest case, all units are connected by simple electric lines. However, the data exchange can also take place by way of a data bus, if one is provided in the vehicle, which has the advantage that all information is available on all connected units. If the analyzing device 4 or the data bus fails, the throttle valve adjustment generally has a mechanical device, for example, in the form of a spring, which moves the throttle valve 5 into the closed position, so that the internal-combustion engine is operated in the idling mode. Of course, in this case, the internal-combustion engine can also be stopped by switching off the fuel supply.

The described safety system has the advantage that independent quantities can be used for controlling and monitoring the internal-combustion engine. For control, any arbitrary operating quantity which is indicative of the engine load ($load_{act}$) is detected. In addition to (or instead of) the momentary air mass flow $m_{act}$, suction pipe pressure and/or throttle valve position can also be used. For monitoring, the output torque $M_{act}$ of the vehicle is also determined on the basis of the rotational wheel speed $n_{wheel}$.

If the sensing of the air mass flow $m_{act}$ fails, the operation of the engine control will be faulty. However, the safety system operates independently of this input quantity and can therefore, as described above, switch the internal-combustion engine over to an emergency operation or stop it. If, on the other hand, the sensing of the rotational wheel speed $n_{wheel}$ should fail, the safety system will also fail, but the engine control can continue to operate properly on the basis of the air mass flow $m_{act}$. In the improbable case that the sensing of both the air mass flow $m_{act}$ and the rotational wheel speed $n_{wheel}$ should fail, secure operation of the internal-combustion engine is no longer possible, because both the engine control and the safety system will fail. In this case, the internal-combustion engine must be stopped.

Another important advantage is the fact that the described safety system can also be used in vehicles with a so-called dynamic torque adjustment. In the case of such engine controls, particularly under transient driving conditions, there is no longer a direct coupling between the throttle valve position $\alpha_{act}$ and the engine load $load_{act}$. Therefore, it is no longer possible to carry out the monitoring based on the throttle valve angle $\alpha_{act}$. If, in addition, the engine control has a torque interface, by way of which additional control components act upon the desired engine torque $M_{des}$, the function of this additional system can also be monitored at least partially by means of the safety system. If the intervention of such an additional system reduces of the desired torque $M_{des}$, this is unimportant for the operating safety. However, an unacceptable increase of the desired torque $m_{des}$ by such an additional system will be recognized by the safety system.

According to the above embodiment, the torque desired by the driver $M_{des}$ is determined on the basis of the accelerator pedal position FP. However, it is also possible to use other suitable input quantities for this purpose, such as the output signal of an automatic speed control. Additional possibilities also exist for sensing the rotational wheel speed $n_{wheel}$, in addition to the sensing of a single rotational wheel speed described in the embodiment. For example, the rotational wheel speeds of several or all wheels 7 can be measured and an effective rotational wheel speed $n_{wheel}$ can be determined therefrom in an arbitrary manner. In principle, the output torque $M_{act}$ can be determined at any point of the transmission line. Only the definition of the torque interface must be adapted to the selected point in the transmission line.

It is advantageous for the safety system also to provide a traction control system in the vehicle. This may be a simple system, for example, in the form of an anti-lock brake system, or it may be a higher-expenditure system, such as a wheel slip control system or a driving dynamics control system. In such traction control systems, the rotational speeds of individual wheels or all wheels 7 are detected and analyzed. It is therefore possible to transmit the rotational wheel speed $n_{wheel}$ determined by the traction control system 13 to the analyzing device 4. Therefore, no additional constructional expenditures are required for the safety system, because all sensors and analyzing devices are already required for other tasks. According to the embodiment, the engine control and the safety system are combined in a common analyzing device 4. However, it is also possible to provide separate devices for this purpose. On the other hand, it is also possible to integrate additional functions, such as the traction control system into the single analyzing device 4.

The safety system depicted in the drawing represents only one possible embodiment and, the scope of the invention is not limited to the example shown. On the contrary, the idea of the invention can be applied to almost all engine controls. The engine load $load_{actual}$ is not the only quantity indicative of the operating condition of the internal-combustion engine. The operating condition can also be characterized by the efficiency, (for example, as a function of the ignition point, air/fuel ratio or fuel switch-off), the number of consuming devices (such as the air-conditioning system or the electric generator), or the condition parameters for functions such as cylinder switch-off, sequential fuel switch-off, gear, gear change, or power transmission. Of course, a combination of these quantities or additional quantities can also be used. In principle, all quantities can be used as the input quantity which influence the condition of the internal-combustion engine, and thus directly or indirectly the propulsion of the vehicle.

In addition to the desired torque, the desired acceleration or the desired rotational speed (each measured on the engine shaft, the transmission shaft or directly at the vehicle wheel) can be used for the desired vehicle propulsion. Furthermore, the fuel quantity indication, the desired throttle valve angle or desired values for the air mass flow or the load can also be used. In addition to the rotational wheel speed, the rotational speed, acceleration or torque can be determined as the measuring quantity for vehicle propulsion, at any point in the transmission line. In addition, the vehicle yaw angle, the vehicle pitch angle or the vehicle rolling angle can also be used.

The essential principle is to determine two desired values on the basis of the driver's desire, one value corresponding to the desired vehicle propulsion, and the other concerning a control or regulating quantity of the internal-combustion engine for adjusting the desired vehicle propulsion. In addition, two independent measuring values are sensed from each of which one actual value is determined which is assigned to the corresponding desired value. Finally, two independent functions are provided, one being used to control or regulate the internal-combustion engine and to determine the desired and actual values for vehicle propulsion; and the second function monitoring the operation of the internal-combustion engine by means of the desired and actual values for the vehicle propulsion provided by the first control unit. If required, the second function sends control commands to the first function for correcting a faulty operation or for rendering the internal-combustion engine inoperative. These two functions can be jointly integrated in the engine control unit 4. However, two separate devices can also be provided. For example, the monitoring function can also be integrated in the traction control system 13.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Safety system for a motor vehicle having an internal-combustion engine, comprising:

a sensor for measuring an accelerator pedal position, means for determining an actual value for at least one operating parameter which is indicative of an operating condition of the internal-combustion engine;

means for determining at least one quantity indicative of vehicle propulsion;

means for determining a desired value for vehicle propulsion and a desired value for the operating parameter indicative of the operating condition of the internal-combustion engine, based on the accelerator pedal position;

means for adjusting the actual value of the operating parameter indicative of the operating condition of the internal-combustion engine to correspond to the determined desired value thereof; and means for the continuously comparing the actual and desired values for vehicle propulsion, and for recognizing a fault if there is a deviation of the actual value from the desired value.

2. Safety system according to claim 1, wherein a deviation is recognized when a difference between the actual and desired vehicle propulsion values exceeds a preset threshold value for a preset time period.

3. Safety system according to claim 1, wherein, when a fault is recognized, adjustment of the operating parameter indicative of the operating condition of the internal-combustion engine is performed on the basis of the differential value.

4. Safety system according to claim 1, wherein, when a fault is recognized, a signal for reducing the actual vehicle propulsion value is transmitted to an ignition adjustment unit for initiating an ignition intervention.

5. Safety system according to claim 4, wherein, when, despite an ignition intervention, the actual vehicle propulsion value exceeds the desired vehicle propulsion value, a signal for switching off the fuel is transmitted to a fuel distributing device.

6. Safety system according to claim 1, wherein, when a fault is recognized, a fault signal is generated and is indicated to the driver.

7. Safety system according to claim 6, wherein, when a fault is recognized, a fault signal is generated and is indicated to the driver and is stored in a memory.

8. Safety system according to claim 7, further comprising a traction control system, and wherein the rotational wheel speed is detected by the traction control system and is transmitted to the analyzing device.

9. Safety system according to claim 1, wherein in addition to the accelerator pedal position, an engine load value and a rotational speed are detected on at least one vehicle wheel;

a desired load value and a desired output torque are determined based on the accelerator pedal position, and an actual output torque is determined based on the at least one rotational wheel speed;

the actual load value adjusted to correspond to the desired load value by influencing an operating parameter which influences the engine load; and the actual output torque and desired output torque are continuously compared, and a fault is recognized if the actual output torque deviates from the desired output torque.

10. A method for controlling operation in a motor vehicle having an internal combustion engine, said method comprising the steps of:

measuring an accelerator pedal position;

determining an actual value for at least one operating parameter which is indicative of an operating condition of the internal combustion engine;

determining an actual value for at least one quantity indicative of vehicle propulsion;

determining a desired value for vehicle propulsion and a desired value for the operating parameter indicative of the operating condition of the internal combustion engine, based on the accelerator pedal position;

adjusting the actual value of the operating parameter indicative of the operating condition of the internal combustion engine to correspond to the determined desired value;

continuously comparing the actual and desired values for vehicle propulsion; and recognizing a fault if there is a deviation of the actual value from the desired value.

* * * * *